US005455862A

United States Patent [19]
Hoskinson

[11] Patent Number: 5,455,862
[45] Date of Patent: Oct. 3, 1995

[54] APPARATUS AND METHOD FOR ENCRYPTING COMMUNICATIONS WITHOUT EXCHANGING AN ENCRYPTION KEY

[75] Inventor: John D. Hoskinson, Pacific, Wash.

[73] Assignee: Crest Industries, Inc., Pacific, Wash.

[21] Appl. No.: 160,897

[22] Filed: Dec. 2, 1993

[51] Int. Cl.$^6$ .................................................. H04L 9/00
[52] U.S. Cl. .............................. 380/21; 380/23; 380/49; 380/46
[58] Field of Search .................................. 380/21, 23, 49, 380/46

[56] References Cited

U.S. PATENT DOCUMENTS

| | | | |
|---|---|---|---|
| Re. 33,189 | 3/1990 | Lee et al. | 380/21 |
| 4,218,582 | 8/1980 | Hellman et al. | 178/22 |
| 4,578,531 | 3/1986 | Everhart et al. | 380/21 |
| 4,607,137 | 8/1986 | Jansen et al. | 380/21 |
| 4,677,670 | 6/1987 | Henderson, Jr. | 380/23 |
| 4,771,429 | 9/1988 | Davis et al. | 380/48 X |
| 4,771,462 | 9/1988 | Hannan et al. | 380/44 |
| 4,809,327 | 2/1989 | Shima | 380/44 |
| 4,876,716 | 10/1989 | Okamoto | 380/21 |
| 4,888,802 | 12/1989 | Cooney | 380/49 |
| 4,910,776 | 3/1990 | Dyke | 380/25 |
| 4,985,919 | 1/1991 | Naruse et al. | 380/18 |
| 5,001,750 | 3/1991 | Kato et al. | 380/18 |
| 5,003,597 | 3/1991 | Merkle | 380/37 |
| 5,029,208 | 7/1991 | Tanaka | 380/21 |
| 5,073,935 | 12/1991 | Pastor | 380/30 |
| 5,081,678 | 1/1992 | Kaufman et al. | 380/21 |
| 5,124,117 | 6/1992 | Tatebayashi et al. | 380/21 |
| 5,144,665 | 9/1992 | Takaragi et al. | 380/21 |
| 5,146,498 | 9/1992 | Smith | 380/21 |
| 5,204,901 | 4/1993 | Hershey et al. | 380/21 |
| 5,222,136 | 6/1993 | Rasmussen et al. | 380/43 X |
| 5,222,141 | 6/1993 | Killian | 380/48 X |
| 5,237,611 | 8/1993 | Rasmussen et al. | 380/21 |

OTHER PUBLICATIONS

B. Schneier, "Untangling Public–Key Cryptography," *Dr. Dobb's Journal*, May 1992, 8 pages.
A. Konheim, *Cryptography: A Primer*, John Wiley and Sons, Inc., 1981, pp. 288–293 and 331–347.

*Primary Examiner*—David C. Cain
*Attorney, Agent, or Firm*—Christensen, O'Connor, Johnson & Kindness

[57] ABSTRACT

An encryption/decryption unit (EDU) and method for determining a data encryption key used in encrypting and decrypting data transmitted over a non-secure communication link. Each EDU includes a central processing unit (CPU) that controls its operation, random access memory (RAM) in which one or more sets of seed keys are stored, and a data encryption standard (DES) coprocessor that implements a data encryption algorithm developed by the U.S. National Bureau of Standards. The CPU includes special circuitry enabling it to operate in an encrypted mode so that it cannot be interrogated to discover the program or data stored therein. Each EDU randomly generates a pointer, bytes of which determine the number of times that a loop is repeated in which values (initially determined by two of the seed keys) are XORed together and encrypted using one of the seed keys to determine a portion of the data encryption key (DEK). The pointer is encrypted, along with other information, producing an encrypted key header that is transmitted to the other EDU establishing the link. Upon receiving the encrypted key header, it is decrypted, and the decrypted pointer is used by the receiving EDU to determine the portion of the DEK developed by the other EDU. The two portions of the DEK are then logically combined at each EDU to produce the final DEK, which is then used during the current communication session for encrypting data exchange between the two EDUs.

25 Claims, 6 Drawing Sheets

APPARATUS AND METHOD FOR ENCRYPTING COMMUNICATIONS WITHOUT EXCHANGING AN ENCRYPTION KEY

FIELD OF THE INVENTION

This invention generally relates to apparatus and method for encrypting data, and more specifically, for encrypting data using an encryption key produced by combining keys randomly determined at two stations initiating communications.

BACKGROUND OF THE INVENTION

The U.S. government has developed and published an encryption scheme known as the Data Encryption Algorithm (DEA) that cannot be broken by the most powerful high-speed computer, or, at least not in a time frame that would be acceptable. Integrated circuits designed specifically for encryption and decryption of data in accordance with the DEA are readily available from several vendors, such as Western Digital™ and are widely used by industry. This algorithm, like most encryption schemes, uses an encryption key to encrypt data for transmission to a remote site. At the receiving site, the encrypted data are decoded using the same algorithm and the same encryption key used by the transmitting site. Successful use of the DEA, and almost any other encryption/decryption algorithm commonly employed to provide secure communications, requires that the station receiving the encrypted transmission have the necessary encryption key to decode an encrypted signal, but that no unauthorized party know or have access to that encryption key.

For most prior art encryption/decryption systems, extensive security measures are required for managing and periodically changing the encryption keys that are used at different sites. Any third party who gains access to the encryption key being used to encrypt data can tap into a non-secure line over which encrypted messages are transmitted and then use the key to decrypt messages that are intercepted. Even if knowledge of the encryption key used is limited to those operating the encryption/decryption equipment in a network, it is possible for others outside the organization to breach the security and learn the encryption key due to the failure of someone to follow security procedures that should be followed by those using the system.

Since any person with access to the encryption keys can breach the security of encrypted communications between members of a secure network, encryption keys are typically changed on a regular basis. Frequent changes in the encryption keys in use minimize the risk of disclosure by individuals that previously had access to the keys. However, any such change requires that the new encryption keys be distributed to all stations comprising the network. In many cases, the new encryption keys must be hand-carried to each station site by bonded couriers, any of whom might breach security. Even if a security breach does not occur, the cost of regularly distributing encryption keys to each station of a large network in this manner may be prohibitive.

For these reasons, it is preferable to use encryption keys at each station in a network that are not known to anyone, even those operating the encryption/decryption apparatus. Various techniques have been developed to access encryption keys stored in an electronic memory for this purpose. For example, a new encryption key can be selected for subsequent encryption of communications between stations based on the last encryption key that was used, by applying a secret formula to generate the new key. However, if the formula is discovered or otherwise becomes known by someone who is outside the organizational network, security of the encryption system is breached, since that person can generate the encryption keys that will subsequently be used, simply by applying the formula to any previously discovered key.

Clearly, it would be preferable to randomly generate the encryption key that is used to encrypt data transmitted to another station each time that communications are initiated between any two stations on a network. Yet, random generation of an encryption key at one station inherently renders the receiving station unable to decrypt the message, because it does not have the encryption key used.

A solution to this problem is disclosed in U.S. Pat. Nos. 5,237,611 and 5,222,136, both of which are commonly assigned to the same assignee as the present invention. The apparatus and method disclosed in these patents uses an encryption/decryption unit (EDU) that includes a central processing unit (CPU) to control the operation of the EDU, and random access memory (RAM) in which tables of key exchange keys (KEKs) are stored. Also provided is a data encryption standard (DES) coprocessor that implements the DES algorithm. These components comprise a module that is embedded in potting material. Any attempt to remove the potting material, either mechanically or by using solvents is likely to result in loss of the data and program code stored in the module. The CPU includes special circuitry enabling it to operate in an encrypted mode and to be locked so that it cannot be interrogated to discover the program or data stored in the module. This program enables the EDU to establish secure communications with another, similar EDU over a non-secure link. Each EDU involved in establishing a secure communication session randomly generates a portion of a session data encryption key (DEK) that is encoded by using a KEK from either a public or private table of KEKs stored in the embedded RAM. The two EDUs exchange the encrypted portions of the DEK, along with first and second check values, decrypt the portions by using the first and second check values to determine the KEK used by the EDU at the other site to encrypt the portion of the DEK received, and then logically combine the two portions of the DEK to determine the complete DEK that will be used to encrypt and decrypt data during the current communication session. Each EDU is identified by a stored ID assigned when manufactured that subsequently cannot be altered. Use of a third EDU to bridge the link between two EDUs attempting to communicate securely is prevented because the ID of the third EDU does not match the expected ID of either of the other two. If the ID does not match the expected value, the embedded program in the EDU detecting the mismatch terminates the communications.

While the key management technique just described is generally superior to other prior art techniques, it is possible that a party intercepting communications between two EDUs might eventually be able to work backwards from the check values that are exchanged in a number of sessions to determine the KEKs stored in the RAM. Even though each public and private table of KEKs includes over 64,000 keys, the possibility that with sufficient intercepted traffic, the stored table of keys might be discovered has justified developing a different and better approach. Clearly, the solution to this problem must avoid exchanging any value between stations that could serve as a basis for working toward discovery of information that might compromise secure communications. The previously developed approach provided access to only the public network and one private network of KEKs. A better key management technique would provide for selective access to many more private networks, without requiring a different table of KEKs to be stored in RAM for each different network.

SUMMARY OF THE INVENTION

In accordance with the present invention, a method for establishing secure communications between a first station and a second station that are coupled together by an unsecure communication link comprises the step providing the first and the second stations with a plurality of seed keys that are common to both stations, but are not publicly known. At the first station, a first pointer value is randomly selected, and at the second station, a second pointer value is randomly selected. At each station, a succession of values are cyclically and repetitively encrypted using one of the seed keys as an encryption key. Each encrypted value determines a new value that is then encrypted. A first value of the succession of values that is initially thus encrypted is determined as a function of at least one of the plurality of seed keys. Encryption of the succession of values cyclically repeats for a number of times that determined as a function of the first pointer value at the first station, and as a function of the second pointer value at the second station. A last encrypted value that is thus determined at the first station corresponds to a first portion of a session data encryption key; and a last encrypted value that is thus determined at the second station corresponds to a second portion of the session data encryption key. The first and second portions of the session data encryption keys are temporarily stored at the respective stations.

Using one of the seed keys as an encryption key, the first pointer at the first station and the second pointer at the second station are respectively encrypted, to produce a first encrypted header at the first station and a second encrypted header at the second station. The first and the second encrypted headers are interchanged between the first and the second stations. Using the one seed key, the first encrypted header is decrypted at the second station, and the second encrypted header is decrypted at the first station, to recover the first and second pointers, respectively.

Based upon the plurality of seed keys, the repetitive cyclic encryption step is repeated to determine the first portion of the session data encryption key as a function of the first pointer at the second station, and to determine the second portion of the session data encryption key as a function of the second pointer at the first station, respectively. At each station, the first and second portions of the session data encryption key are combined to determine a final session data encryption key. Using the final session data encryption key at each station, data exchanged between the two stations are encrypted and decrypted.

Each station is provided with identical first, second, and third seed keys. In producing each portion of the session data encryption key, the third seed key is logically combined with the second seed key to form the first value. Then, the first value is encrypted with the first seed key to form an encrypted value. Next, the encrypted value is logically combined with the first value to form a new value. The new value is encrypted with the first seed key to form a new encrypted value. And finally, the last two steps are repeated for the number of times determined by the appropriate one of the first and second pointers to obtain the last encrypted value. The first and second pointers are used as a counter indices to determines the number of times that the steps of logically combining and encrypting are implemented. Preferably, the first and second pointers each comprise a plurality of bytes, each byte serving as a successive counter index to determine the number of times that the steps of logically combining and encrypting are implemented, until the number of times determined by a last byte of the pointer is completed.

The method further comprises the steps of accumulating a cyclic redundancy check value for each portion of the session data encryption key; and encrypting the cyclic redundancy check values at each station as part of the first and second encrypted headers. The cyclic redundancy check values are decrypted after the first and second encrypted headers are interchanged between the first and the second stations and used to determine whether an error has occurred in the determination of the first and second portions of the session data session encryption key by the second and the first stations, respectively.

In addition, the method includes the step of including network cyclic redundancy check values as part of the first and second encrypted headers that are interchanged by the first and the second stations. These network cyclic redundancy check values are decrypted to confirm that the first and the second stations are both members of a common network.

Each station is identified by a unique station identification code that is unalterable. The station identification code is included in at least one of the first and second encrypted headers and is used to ensure that a secure communication link is established only between two stations intending to communicate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
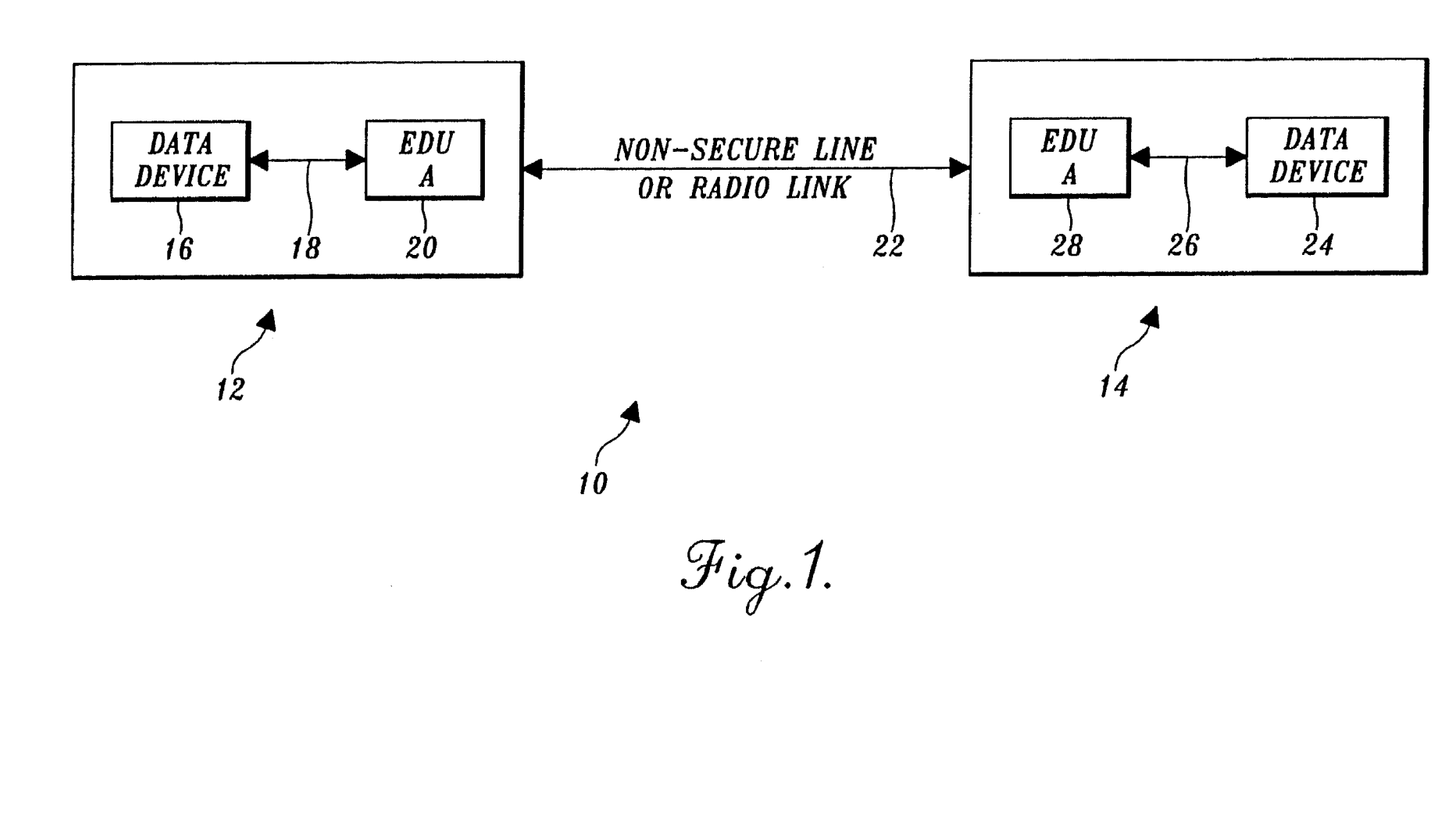
FIG. 1 is a block diagram of a communications network comprising two stations, each provided with an encryption/decryption unit (EDU) in accordance with the present invention.

Referring to FIG. 1, a network 10 comprising a station 12 and a station 14 illustrates how the present invention is used in carrying out encrypted communications. Although network 10 is shown simply as comprising two stations, it should be appreciated that the network can include many other such stations, any two of which are selectively connected together to carry out secure communications using the present invention.

Both stations 12 and 14 employ identical components for encrypting and decrypting communications. Specifically, station 12 includes a data device 16 comprising, for example, a facsimile machine or personal computer, neither of which are separately shown. Lines 18 connect data device 16 to an EDU 20. Station 12 uses EDU 20 to establish secure communications over a non-secure line (or radio link) 22 with station 14. Station 14 also includes an EDU 28, which is connected to a data device 24 over lines 26. Data device 24 typically would be the same type of device as data device 16. Thus, if data device 16 is a facsimile machine, data device 24 would also likely be a facsimile machine. However, with recent advances in modem technology, those of ordinary skill in the art will also appreciate that a personal computer can function as a facsimile machine if provided with the appropriate hardware and software. In any case, communication network 10 permits secure communication of virtually any type information, including facsimile, data, and digitized voice, between stations 12 and 14, over non-secure line 22.

The present invention establishes secure communication between EDU 20 and EDU 28 without use of a public key, making it virtually impossible to tap into non-secure line 22, even if a similar EDU (not shown) is employed for that purpose. Preferably, communication between EDU 20 and EDU 28 are encrypted using a DEK that is changed each time the two EDUs link in a communication session. The DEK comprises two parts, one part determined based upon a pointer value that is randomly selected by EDU 20, and the other part determined as a function of a different pointer value randomly selected by EDU 28. The pointer selected by each EDU is encrypted using one of three secret seed keys that are stored within the EDU to form an encrypted header that is transmitted to the other station.

Both stations 12 and 14 decrypt the transmission received from the other station using the same seed key (now serving as a decryption key) previously used as the encryption key for the header, to recover the pointer selected by the other station. That pointer is then used to determine the portion of the session key that the other station determined. The two portions of the session DEK are logically combined at each station to produce a complete or final DEK used for encrypting data transmitted between stations 12 and 14 during the current session. The EDUs are preprogrammed to ensure that the intended station in a two-way communication link is actually receiving or transmitting the encrypted data, to guard against a third party tapping into non-secure line 22 with another EDU. The program running in the EDUs also ensures that the two pointers, which are exchanged between stations 12 and 14, are correctly received and decrypted and that the two portions of the session DEK are correctly determined using the pointer. This step protects against data errors that might arise in the transmission of the encrypted pointers between the two stations or in the determination of the two portions of the session DEK as a function of the pointers that were exchanged.

Figure 2:
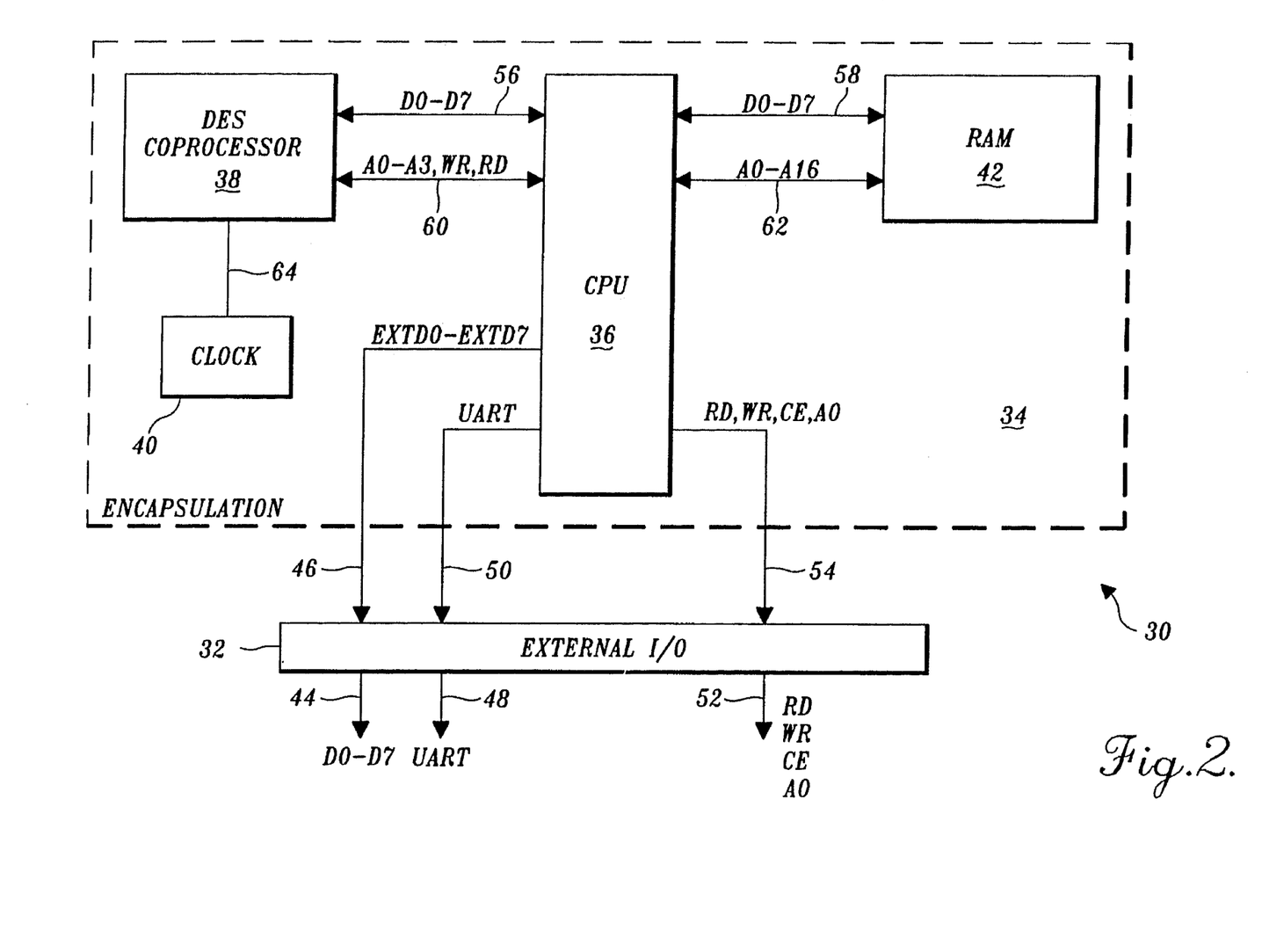
FIG. 2 is a schematic block diagram of one of the EDUs shown in FIG. 1.

Referring now to FIG. 2, a block diagram of EDU 20 is shown; EDU 28 is exactly the same, except that it has a different EDU identification number stored within it. EDU 20 includes a potted module 30 and an external input/output (I/O) bus 32 for providing interconnections between the EDU and the data device (or interconnections with other components, if the EDU is used as part of a more extensive data encryption apparatus). The data device provides the data to be encrypted or receives the data that were decrypted by the EDU. Potted module 30, which comprises substantially the entire EDU, is encapsulated within a radio-opaque and light-opaque potting compound 34 to prevent discovery of the internal circuitry of the module, and to prevent forced electromagnetic or visual tapping, monitoring, or other forms of penetration of potted module 30 that might be attempted to uncover the seed keys and other information stored therein. Potting compound 34 is sufficiently hard and resistant to abrasion to prevent its removal without damaging the components comprising the EDU or at least causing loss of important data stored therein. Of greatest sensitivity for maintaining the security of communications between EDUs comprising a secure network is the requirement for protecting against discovery of the seed keys that are stored within each EDU and used for determining portions of the DEK and for encrypting and decrypting the 64-bit pointers randomly generated by the two stations engaging in the secure communication link. To prevent breaching the security of communications on network 10, it is absolutely essential that these seed keys stored within the EDU not become publicly known.

In the preferred form of the invention, a plurality of sets of seed keys are stored in encrypted form in RAM 42 within potted module 30. One set of seed keys stored within the module is referred to as a "public" set, since each EDU that will be sold will include this set. Each of the other sets of seed keys, if provided, are used in communication with one or more other EDUs comprising a specific "private" network; an identical set of seed keys for a given private network are stored in each of the other EDUs comprising that private network. The private network sets of seed keys are very important to limit secure communications only between certain sites having a need to communicate highly sensitive information and data.

For example, a corporation may elect to establish ten private networks, each private network representing a different segment of the corporation's business. An EDU assigned to the president or chief executive officer of the corporation would likely include all ten sets of seed keys for the private networks, while managers of each business sector assigned to a different one of the private networks might be assigned EDUs with only one or two sets of seed keys for the private networks on which they have a need for carrying out secure communications. In this manner, ultra secure communications (secure even relative to other employees within a corporation) can be accomplished using the appropriate private network set of seed keys, while secure communications throughout the corporation can be accomplished using the public seed keys, or perhaps using one private set of seed keys, to ensure that communications are limited to EDUs at stations only within the corporation.

RAM 42 preferably comprises 128K by 8 bits of storage, i.e., yielding one megabit of non-volatile static RAM. This memory integrated circuit is a dual in-line package (DIP) configuration of generally conventional design and uses an internal battery supply (not separately shown) in a CPU 36, to maintain data integrity in the absence of externally applied power to the EDU for a period in excess of ten years. In the event a chemical solution is used to dissolve potting compound 34 in an attempt to discover the seed keys stored in RAM 42, the material comprising RAM 42 and CPU 36 will also be dissolved, thereby disconnecting the battery supply and erasing the seed keys that are stored therein.

Operation of potted module 30 to establish and conduct secure communications is controlled by CPU 36. In the preferred embodiment, a Dallas Semiconductor™ type DS5002 microchip integrated circuit is used for CPU 36. Data stored within RAM 42 comprise program steps that are carded out by CPU 36 in establishing secure communications; initial loading of the RAM is accomplished with a conventional universal asynchronous receiver/transmitter (UART) interface (not shown) that is connected through external I/O bus 32 via lines 48. UART lines 50 couple the signals from I/O bus 32 to CPU 36, which encrypts the signals for storage in RAM 42. In addition, control lines 52 convey read (RD), write (WR), clear entry (CE), and address zero (A0) signals to I/O bus 32; these signals are in turn conveyed through lines 54 to CPU 36.

To provide the highest level of security, CPU 36 operates in an encrypted mode. Before the initial loading of program code and data into RAM 42 begins (during manufacture of the EDU), a 64-bit encryption mode key is randomly selected by CPU 36 for use in encrypting the program code and data. This internal encryption mode key is not accessible from outside the CPU. A data encrypter circuit and an address encrypter circuit (neither separately shown) within CPU 36 respectively control the form in which the program code is stored in RAM 42 and the addresses at which it is stored. As the initial loading of program steps is performed, the data encrypter circuit uses the 64-bit encryption mode key to transform or encrypt opcodes, operands, and data bytes at each memory location defined by the software. Similarly, the address encrypter circuit uses the encryption mode key in a different encryption algorithm to translate or encrypt a logical address for each data byte location into an encrypted address at which the data are actually stored. The contents of RAM 42 are then verified, and further changes to the data are disabled by setting a security lock bit. After the security lock bit is set, CPU 36 operates in the encryption mode; the encrypted contents of RAM 42 are thus unintelligible to an observer that might attempt to tap into its circuitry to discover the program code and other data stored therein.

The address and data encrypter circuitry provides real time translation or decryption of program code in address locations to CPU 36 during subsequent operation of the EDU. Only program code and data stored in the CPU's scratch-pad RAM that does NOT affect secure operation of the EDU can be changed after the security lock bit is set. Any attempt to externally interrogate the CPU to discover the 64-bit encryption key causes erasure of the key, rendering the contents of RAM 42 useless. Even if the encrypted program code and data are thereafter read back from the RAM, they cannot be decrypted without the 64-bit encryption mode key, which was lost when it was erased.

CPU 36 selects a specific storage location for a seed key within RAM 42 by setting 16-bit address lines 62. (Address bit A0 is set externally by the data device to determine whether the status or data registers are active.) The address set on address lines 62 determines the location to which seed keys are initially written and subsequently retrieved over data lines 58. Data lines 58 comprise data bits D0 through D7. When the seed keys are originally stored in RAM 42 during manufacture of the EDU, they are input to CPU 36 over UART lines 48 and 50 in an encrypted form, from an external storage device (not shown). The seed keys are not known to anyone. Data to be encrypted are conveyed to I/O bus 32 over data lines 44 and 46. These data are conveyed from the bus to CPU 36 over lines 46.

Although CPU 36 controls the operation of potted module 30, the actual encryption and decryption of data during a communication session are implemented by a data encryption standard (DES) coprocessor 38. DES coprocessor 38 is designed to encrypt and decrypt 64-bit blocks of data using the algorithm specified in the Federal Information Processing Data Encryption Standard (46). A transfer rate of approximately 807 kilobytes per second is implemented by DES coprocessor 38 under the control of a 10 MHz clock circuit 40, which is coupled to the DES coprocessor by lines 64. Data are transferred between CPU 36 and DES coprocessor 38 over lines 56.

In the preferred embodiment, a Western Digital™ type DES WD20C03A integrated circuit is used for DES coprocessor 38, although other such devices are available from other suppliers. Lines 60 convey two address bits A0 through A1 and write (WR) and read (RD) signals between DES coprocessor 38 and CPU 36.

The appropriate program steps for controlling EDU 36 are loaded into RAM 42 at the time potted module 30 is manufactured. In addition, RAM 42 is then loaded with one or more sets of seed keys. Any EDU can establish secure encrypted communications with any other EDU using the set of public seed keys that are stored in every EDU manufactured. Also stored within RAM 42 can be one or more private sets of seed keys. As explained above, these private sets of seed keys are used for initiating secure communication with another EDU that is a member of the same private network, and thus has the same private set of seed keys stored within its RAM 42.

In the preferred embodiment, there are only three seed keys for each set. Each of the three seed keys comprises 8 bytes, for a total of 64 bits/seed key. The first seed key is not changed during the process used to determine the portion of the DEK, and thus serves to encrypt a header that includes the pointer randomly generated by the EDU. During the determination of a portion of the DEK, registers initially loaded with the second and third seed keys are used to store intermediate values, as will be apparent from the discussion that follows. As will be apparent to those of ordinary skill in the art, a different number of seed keys could alternatively be used by each EDU in determining the DEK that will be used during a current encrypted communication session.

RAM 42 is also used to store status registers that comprise four organization ID bytes, two network cyclic redundancy check bytes, and two optional flag bytes. In addition, the memory holds eight non-encrypted registers, which comprise two bytes identifying the EDU software version and six bytes that are presently not used, and eight encrypted registers. These encrypted registers hold the network CRC (two bytes), and two bytes representing the key sequence CRC. The remaining four bytes of the encrypted register comprise the EDU ID. In addition, eight bytes are reserved in a header register assignment for the DEK pointer that is randomly generated by the EDU at the start of each communication session.

Figure 3:
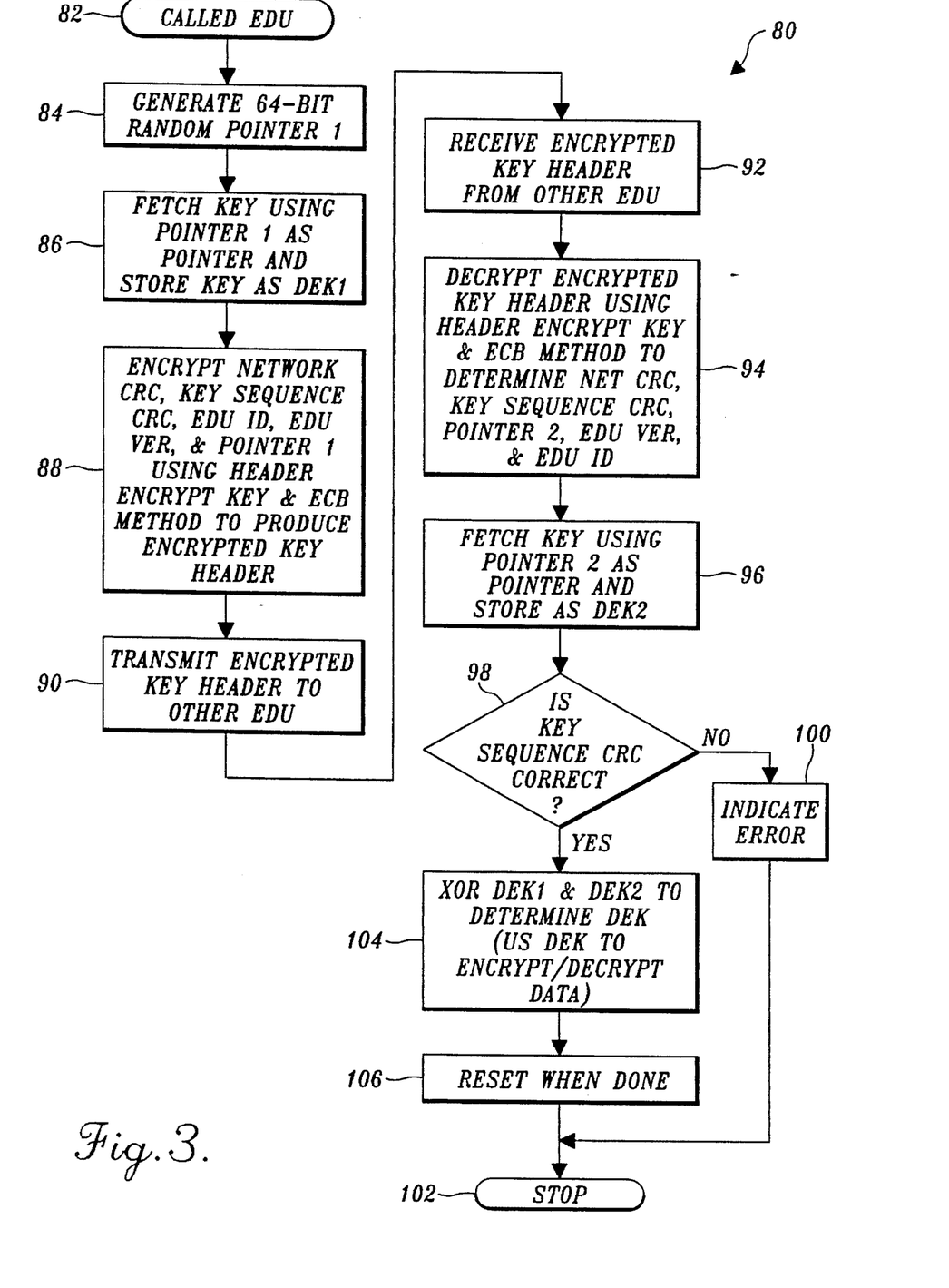
FIG. 3 is a flow chart illustrating the logical step implemented by the EDU in a station that is called by another station, to determine a DEK that will be used during a current session of communication.

In FIG. 3, a flow chart 80 identifies the steps taken by the EDU at the station called by another site, in establishing secure communications. Assuming that EDU 28 is the recipient of a call initiated by EDU 20 (referring to FIG. 1), EDU 28 is the "called EDU" in block 82 of flow chart 80. As shown in a block 84, CPU 36 within EDU 28 responds upon receiving an initial request to communicate from EDU 20, by generating a 64-bit random pointer 1. As noted above, the randomly generated pointer is assigned to 8 bytes in the header that will be encrypted by EDU 28 for transmission back to EDU 20, the "calling EDU." In a call to a fetch key subroutine indicated in a block 86, a portion of the DEK is determined using pointer 1. Once this portion of the DEK is determined, it is temporarily stored in the scratchpad RAM of CPU 36.

Figure 5:
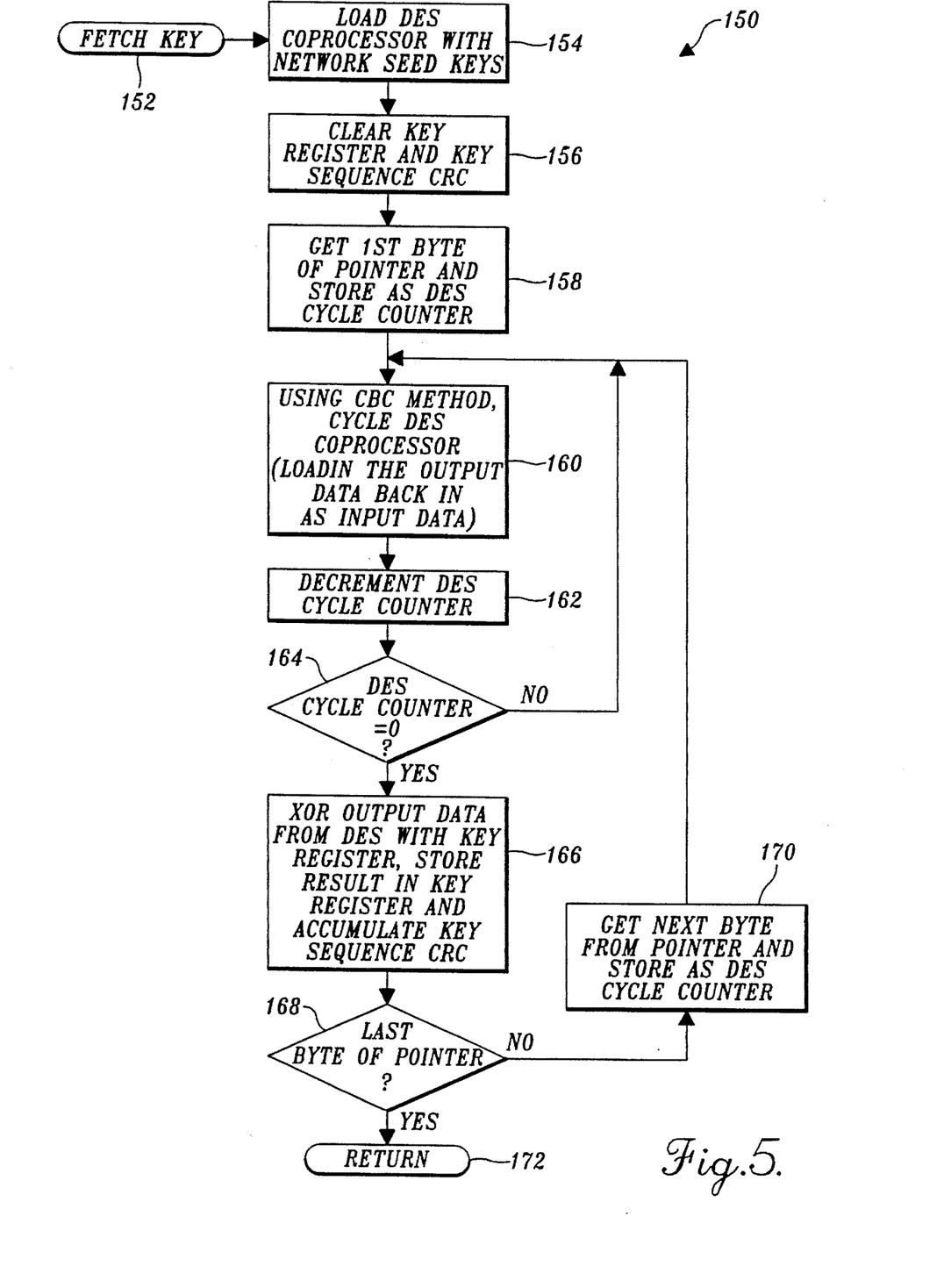
FIG. 5 is a flow chart illustrating the steps of a subroutine used by EDUs in both stations joining in a secure communication link, to determine a portion of the DEK.

At this point, it is appropriate to turn to FIG. 5, which shows the steps of the fetch key subroutine used to determine the portion of the DEK. This subroutine is disclosed in a flow chart 150, which begins with a block 152, in which the fetch key subroutine is initiated. In a block 154, DES coprocessor 38 is loaded with the appropriate set of seed keys for the network over which secure communication is being initiated. As explained above, the seed keys loaded at this step can either be the public set of seed keys, with which all EDUs are provided, or may be a specific private set of seed keys unique to a particular network. The set selected depends upon the network ID transmitted by the calling EDU.

In a block 156, the register used to store the portion of the data key that will be developed by the called EDU is cleared, as well as the two bytes that will be used to store the key sequence CRC. These registers are cleared in preparation for loading new values into each register after the called EDU develops its portion of the data encryption key to be used for this communication session.

A first byte of the pointer (pointer 1) randomly generated before the fetch key routine was called is obtained and stored as a DES cycle counter in a block 158. As will be evident from the following explanation, CPU 36 uses successive bytes of this pointer as counter-indices to determine the number of times that a loop is implemented to develop the portion of the DEK. The loop starts with a block 160 in which a CBC method employees the three selected seed keys using DES coprocessor 38 in a ring sequence. Details of this ring sequence are shown in FIG. 6.

Figure 6:
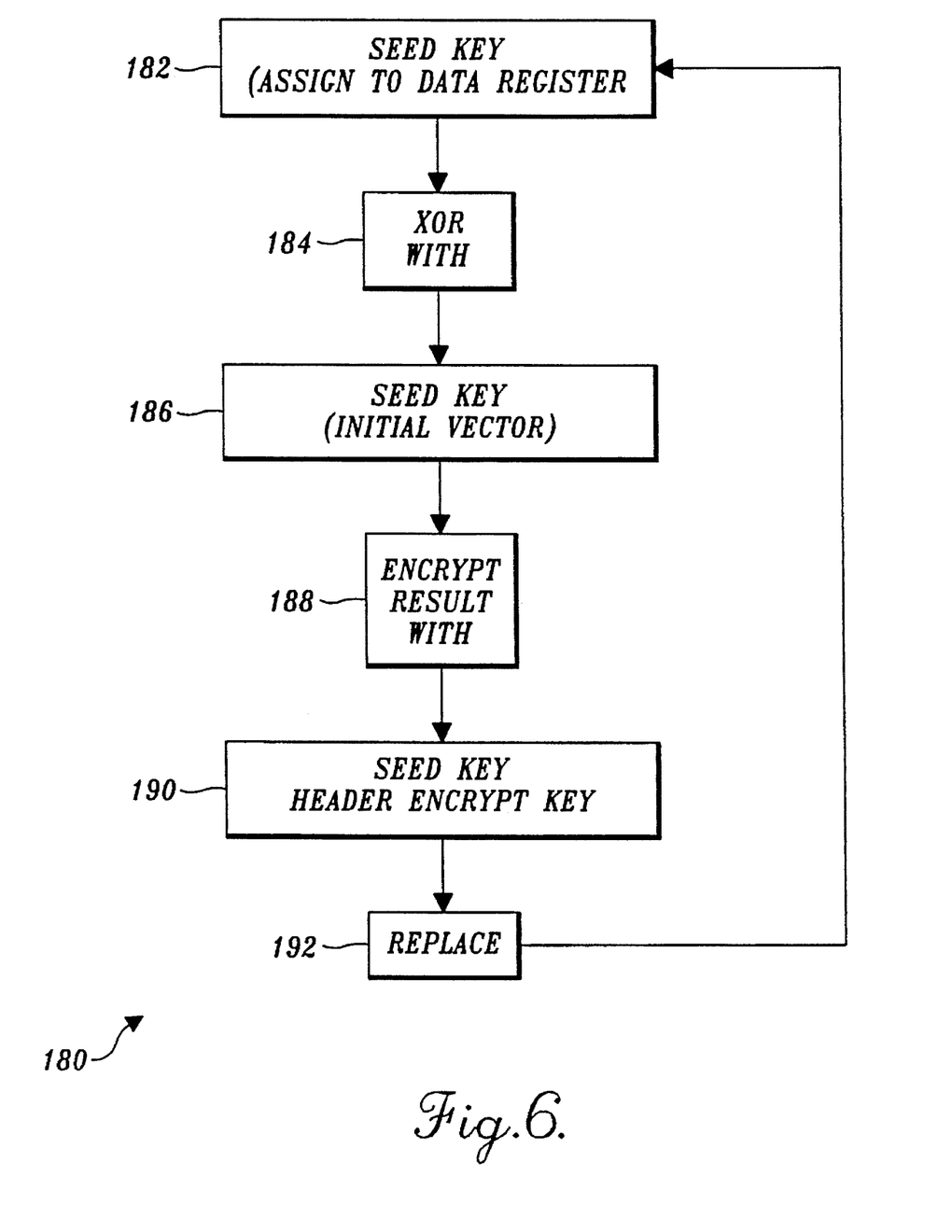
FIG. 6 is a block diagram that illustrates the cyclic process that is repeated for a number of times to determine the portion of the DEK, as a function of a pointer that is randomly selected by one of the EDUs.

Turning now to FIG. 6, in a block 182, the third seed key is initially assigned to the data register that will eventually hold a portion of the DEK. Subsequently, this register is used to store a succession of intermediate values, each time that a loop 180 shown in FIG. 6 is repeated. Next, as indicated by a block 184, the value assigned to the data register in the preceding step is logically XORed with the second seed key. As indicated in a block 186, the second seed key is loaded into an initial vector register. After XORing the data register with the second seed key, the result replaces the second seed key in the initial vector register. Then, as indicated by a block 188, the DES coprocessor is used to encrypt the result of the preceding XOR operation with the first seed key (which is also referred to as the header encrypt key), as indicated in a block 190. The result of this encryption operation replaces the value in the data register, as indicated in a block 192, setting up loop 180 for another repeat cycle.

Referring back to FIG. 5, before loop 180 is repeated, a block 162 provides for decrementing the DES cycle counter. Thereafter, a decision block 164 determines if the DES cycle counter is equal to zero. If not, the logic returns to block 160, to repeat loop 180 in FIG. 6.

To ensure that the CBC method is clearly understood, it may be helpful to work through loop 180 a second time. Referring back to FIG. 6, the value that replaced the third seed key in the data register in block 182 is XORed with the value in the initial vector register. The new result from the current XOR operation replaces the value previously stored in the initial vector register and is then encrypted using the header encryption key, producing a new value that is assigned to the data register in block 182.

As indicated by decision block 164 in FIG. 5, loop 180 cyclically repeats until the cycle counter equals zero, at which point the logic proceeds to a block 166. In block 166, the data produced from encrypting the value in the initial vector register with the first seed key during the last time through the loop are XORed with the contents of the DEK register, which stores the result produced from the last sequence of repetitive loops 180. Following the first sequence of loops corresponding in number to the first byte of the pointer, the value in the DEK cycle counter is zero, so the result of the last encryption operation becomes the value in the DEK register. However, thereafter, as the sequence of loops is repeated for successive times determined by each of the remaining bytes of the pointer, the previous value in the DEK register is XORed with the final result of loop 180, in accordance with block 166.

A decision block 168 determines if the last byte of the point has been used as an index for the DES cycle counter, and if not, the next byte from the pointer is obtained and stored as the index for the DES cycle counter in a block 170, leading back to repeat the sequence of loops in block 160. When the last byte of the pointer has been used, the last encrypted value is XORed with the value last stored in the DEK register and the result is the portion of the DEK developed by the called EDU. A block 172 then returns to flow chart 80 in FIG. 3.

Following a return from the fetch key subroutine, flow chart 80 proceeds with a block 88 in which a network CRC, the key sequence CRC, the EDU ID for the called EDU, the EDU software version, and pointer 1 are all encrypted using the header encrypt key, i.e., the first seed key, by DES coprocessor 38, producing an encrypted key header. In a block 90, the encrypted key header is transmitted to the calling EDU, which in the example, is EDU 20. While EDU 28 is determining one portion of the DEK, EDU 20 is also carrying out a corresponding operation to determine another portion of the DEK, as explained below.

In a block 92, EDU 28 receives an encrypted key header from EDU 20. Thereafter, as provided in a block 94, DES coprocessor 38 in EDU 28 decrypts the encrypted key header received from EDU 20, using the header encrypt key, i.e., the first seed key, yielding the net CRC, another key sequence CRC, a pointer 2 (which was determined by EDU 20 as a randomly generated value), the EDU software version used by EDU 20, and the ID of EDU 20.

In accordance with a block 96, EDU 28 calls the fetch key subroutine and repeats the same series of steps in loop 180, using successive bytes of pointer 2 as the DES loop counter indices. After proceeding through all the requisite repetitions of the loop determined by the bytes of pointer 2, CPU 36 in EDU 28 will have determined the other portion of the DEK that is based upon pointer 2. Since pointer 2 was randomly generated by EDU 20, this portion of the DEK is also in a sense, a randomly generated value—one of literally many quadrillions of possible 64 bit values.

A decision block 98 determines if the key sequence CRC for the portion of the DEK determined as a function of pointer 2 is correct. In this determination, the decrypted key sequence CRC obtained from EDU 20 in the encrypted header received is compared with the key sequence CRC that EDU 28 computed while determinating the portion of the DEK based upon pointer 2. If the two key sequence CRCs are not equal, the logic proceeds to a block 100, where an error is indicated that causes EDU 28 to cease further attempts at encrypted communication with EDU 20, as noted in a block 102.

However, assuming that the result of decision block 98 shows a match between the two key sequence CRC values, a block 104 provides for logically combining the two portions of the DEK determined by EDU 20 and EDU 28, using an XOR operation to produce the final DEK. This final DEK is then used to encrypt and decrypt data transmitted back and forth between EDU 20 and 28 during the current communication session. After all communications are completed, a block 106 resets EDU 28 and then proceeds to block 102 to terminate further communication.

Figure 4:
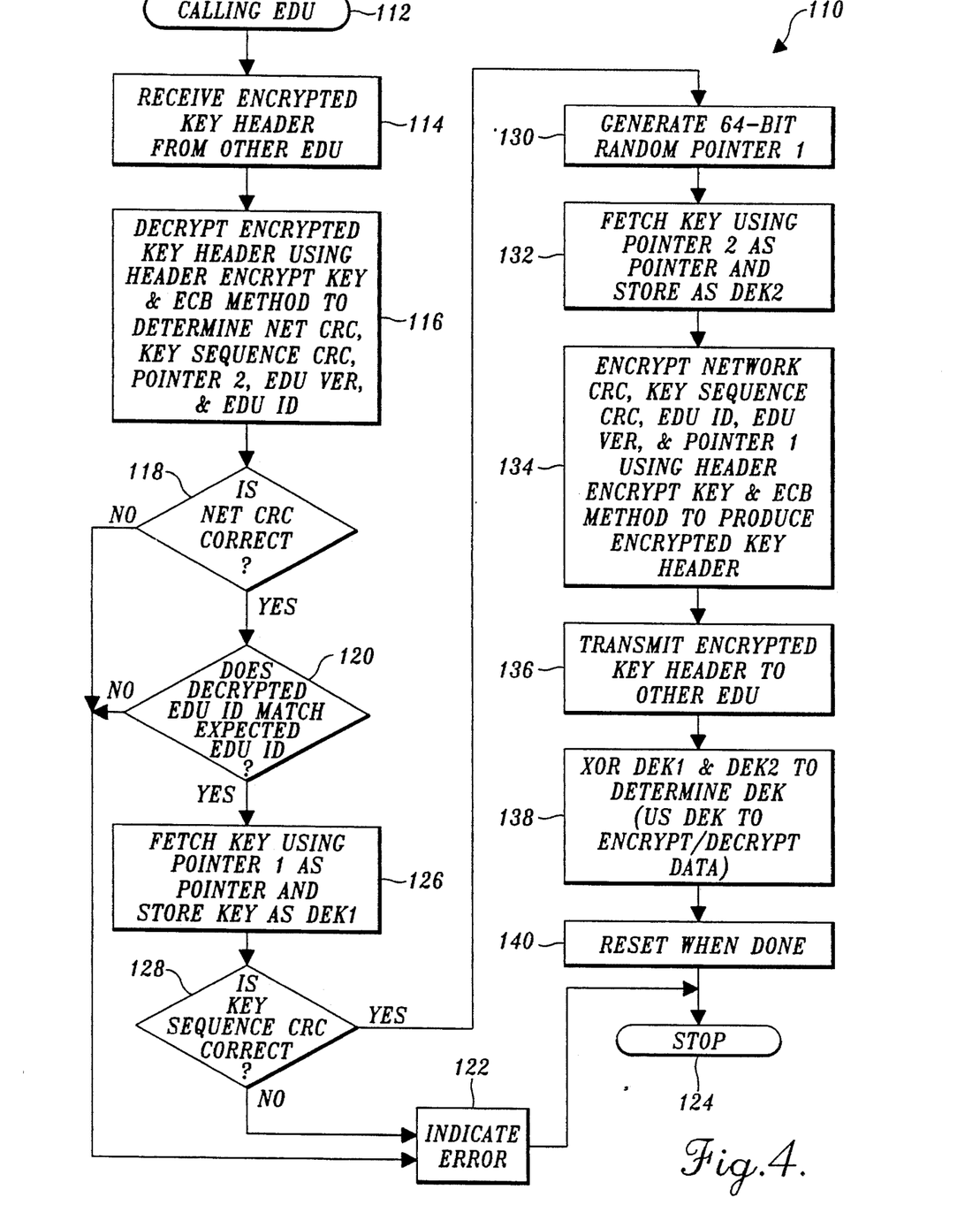
FIG. 4 is a flow chart showing the steps carried out by the EDU in the station that initiated the communications, to determine the DEK.

Referring now to FIG. 4, a flow chart 110 illustrates the steps carried out by EDU 20, which was the calling EDU, as indicated in a block 112. In a block 114, EDU 20 receives the encrypted key header from EDU 28. In a block 116, EDU 20 decrypts the encrypted key header that it received using the first seed key, i.e., the header encrypt key, by providing that first seed key as a key input to its DES coprocessor 38. In addition, the decryption of the encrypted key header yields the NET CRC and the key sequence CRC for the portion of the DEK determined by the called EDU. The EDU software version used by the called EDU and its ID are also decrypted. More importantly, in block 116, the value of pointer 1, which was randomly generated by EDU 28, is decrypted.

Next, in a decision block 118, EDU 20 determines if the net CRC decrypted in block 116 corresponds to the net CRC stored in its register. This step ensures that two EDUs entering into a secure communication link are indeed members of the same private network. If the net CRC received from the called EDU does not match that of the calling EDU in decision block 118, the logic proceeds to a block 122, to indicate an error, and then to a block 124, which provides for stopping further communications between the two EDUs. However, assuming that the net CRCs match, a decision block 120 next determines if the decrypted EDU ID of the called EDU matches the expected EDU ID. Since the encryption of the EDU ID is carried out automatically by EDU 28 and cannot be modified or affected by external signals or reprogramming, it is virtually impossible for a third party to use another EDU to break into a communication link being established and/or take part in establishing secure communications, since the encrypted EDU ID that is returned to the station that initiated the communication would then not match the expected EDU ID. A negative response to decision block 120 again causes the logic to proceed to block 122, indicating an error has occurred, and detection of such an error causes the attempted communication link to be halted in block 124.

However, if the decrypted called EDU ID matches the expected EDU ID in decision block 120, the fetch key subroutine is called in a block 126. In this instance, pointer 1 that was decrypted in block 116 provides the successive bytes for the DES counter indices, which determine the number of repetitions of loop 180. The fetch key subroutine as implemented in block 126 thus yields a value for the portion of the data encryption key determined by EDU 28, which is stored as value DEK1 in the scratch-pad RAM of CPU 36. A decision block 128 determines if the key sequence CRC computed by EDU 20 when determining DEK1 matches that decrypted in block 116. If not, the logic proceeds to block 122 to indicate an error, which again causes termination of communications between the two EDUs. If the key sequence CRCs match, the logic proceeds to a block 130, wherein EDU 20 randomly generates its own 64-bit pointer 2.

The fetch key subroutine is called in a block 132, using pointer 2 as the pointer to provide the successive indices for the DES counter loops. The fetch key routine returns the portion of the session DEK determined by EDU 20, which is stored as a value DEK2.

In a block 134, CPU 36 in EDU 20 encrypts the network CRC, the key sequence CRC corresponding to the CRC for the value DEK2, its EDU ID, the EDU software version that EDU 20 is using, and the value of pointer 2, using seed key 1 as the encryption key input to DES coprocessor 38. The result is an encrypted key header which, in a block 136, is transmitted to EDU 28. Finally, in a block 138, CPU 36 of EDU 20 carries out the XOR operation to logically combine DEK1 and DEK2, yielding the final session DEK, i.e., the data encryption key used to encrypt and decrypt data transmitted between the two EDUs during the current session. After all communications are completed, a block 140 resets EDU 20, and the logic proceeds to block 124, wherein further communication between the two EDUs is halted.

During the process of establishing secure communications, neither of the two EDUs linking together transmits DEK1 or DEK2 in the clear or in an encrypted form. Further, either the public set or one of the private sets of seed keys is used for determining the first and second portions of the current session DEK. Consequently, only EDUs provided with the same control program and the same set of seed keys used to encrypt the transmitted encrypted key header are able to recover the first or second pointers, which are necessary to determine the first and second portions of the DEK, respectively. Since the software program controlling the operation of the EDUs requires that the EDU ID be encrypted as part of the key header information that is exchanged between two EDUs, a third EDU cannot be used to surreptitiously substitute for one of the intended EDUs by bridging the line during the establishment of the secured communication link. Consequently, only the EDUs at the receiving and transmitting stations comprising an intended link are able to communicate so as to establish a session DEK and thereafter carry on secure communications.

Furthermore, it will be apparent that only an EDU having the same session DEK used to encrypt data at one station can decrypt the data at another. Finally, although any EDU can establish secure communications with any other EDU using the same public set of seed keys, only EDUs using the same set of private seed keys can establish a session DEK to communicate with each other.

While the DES algorithm is used in the preferred form of the present invention for encrypting data once the DEK has been determined, it will be appreciated that other encryption algorithms or encryption integrated circuits, such as Skipjack (also known as Clipper) can be employed. It should also be apparent that the encrypted key header need not include the EDU ID, it a lower level of security is acceptable, for example, in a local network of EDUs exclusively using private sets of seed keys. These and other modifications to the present invention will be apparent to those of ordinary skill in the art. Accordingly, it is not intended that the invention be in any way limited by the description of the preferred embodiment and modifications thereto, but instead that the scope of the invention be determined entirely by reference to the claims that follow.

The embodiments of the invention in which an exclusive property or privilege is claimed are defined as follows:

1. A method for establishing secure communications between a first station and a second station that are coupled together by an unsecure communication link, comprising the steps of:

(a) providing the first and the second stations with a plurality of seed keys that are common to both stations, but are not publicly known;

(b) at the first station, randomly selecting a first pointer value, and at the second station, randomly selecting a second pointer value;

(c) at each station, cyclically and repetitively encrypting a succession of values using one of the seed keys as an encryption key, each encrypted value determining a new value that is then encrypted, a first value of the succession of values that is initially thus encrypted being determined as a function of at least one of the plurality of seed keys, encryption of the succession of values occurring for a number of times determined as a function of the first pointer value at the first station, and as a function of the second pointer value at the second station, a last encrypted value thus determined at the first station corresponding to a first portion of a session data encryption key, and a last encrypted value thus determined at the second station corresponding to a second portion of the session data encryption key, said first and second portions of the session data encryption keys being temporarily stored at the respective stations;

(d) using one of the seed keys as an encryption key, encrypting the first pointer at the first station and the second pointer at the second station, to produce a first encrypted header at the first station and a second encrypted header at the second station, respectively;

(e) interchanging the first and the second encrypted headers between the first and the second stations;

(f) using said one seed key, decrypting the first encrypted header at the second station and the second encrypted header at the first station to recover the first and second pointers, respectively;

(g) repeating step (c), to determine the first portion of the session data encryption key as a function of the first pointer at the second station, and to determine the second portion of the session data encryption key as a function of the second pointer at the first station, respectively;

(g) at each station, combining the first and second portions of the session data encryption key to determine a final session data encryption key; and (h) using the final session data encryption key at each station to encrypt and decrypt data exchanged between the two stations.

2. The method of claim 1, wherein each station is provided with identical first, second, and third seed keys.

3. The method of claim 2, wherein step (c) of claim 1 comprises the steps of:

(a) logically combining the third seed key with the second seed key to form the first value;

(b) encrypting the first value with the first seed key to form an encrypted value;

(c) logically combining the encrypted value with the first value to form a new value;

(d) encrypting the new value with the first seed key to form a new encrypted value;

(e) repeating steps (c) and (d) for the number of times determined by one of the first and second pointers to obtain the last encrypted value which corresponds to one of the first and the second portions of the session data encryption key.

4. The method of claim 3, wherein the first and second pointers are used as a counter indices to determines the number of times that the steps of logically combining and encrypting are implemented.

5. The method of claim 4, wherein the first and second pointers each comprise a plurality of bytes, each byte serving as a successive counter index to determine the number of times that the steps of logically combining and encrypting are implemented, until the number of times determined by a last byte of the pointer is completed.

6. The method of claim 1, further comprising the steps of accumulating a cyclic redundancy check value for each portion of the session data encryption key; and encrypting the cyclic redundancy check values at each station as part of the first and second encrypted headers, said cyclic redundancy check values being decrypted after the first and second encrypted headers are interchanged between the first and the second stations and used to determine whether an error has occurred in the determination of the first and second portions of the data session encryption key by the second and the first stations, respectively.

7. The method of claim 1, further comprising the step of including network cyclic redundancy check values as part of the first and second encrypted headers that are interchanged by the first and the second stations, said network cyclic redundancy check values being decrypted to confirm that the first and the second stations are both members of a common network.

8. The method of claim 1, wherein each station is identified by a unique station identification code that is unalterable, further comprising the step of including the station identification code in at least one of the first and second encrypted headers, said station identification code being used to ensure that a secure communication link is established only between two stations intending to communicate and not with a third station.

9. A method for ensuring secure communications between two sites, comprising:

(a) randomly selecting a pointer;

(b) providing a plurality of seed keys, each having their own initial value;

(c) using one of the seed keys, encrypting a value initially determined by another seed key to produce an encrypted value, said encrypted value being used to determine a successive value that replaces a previous value;

(d) repeating step (c) for a number of times determined as a function of the pointer, each successive value that is encrypted replacing the encrypted value previously determined, the encrypted value last produced comprising a portion of a session data encryption key;

(e) encrypting the pointer with one of the seed keys to produce a locally encrypted pointer;

(f) transmitting the locally encrypted pointer to another site;

(g) receiving a remotely encrypted pointer from another site;

(h) decrypting the remotely encrypted pointer received from the other site;

(i) using the pointer that was decrypted in step (h), repeating steps (c) and (d) to determine a different portion of the session data encryption key;

(j) logically combining the portions of the session data encryption key to form a complete session data encryption key; and (k) using the complete session data encryption key to encrypt and decrypt data sent and received between the two sites.

10. The method of claim 9, wherein the other site carries out substantially the same steps (a) through (d) to determine the different portion of the session data encryption key.

11. The method of claim 9, wherein the pointers each comprise a plurality of bytes, each byte serving as a counter index for determining the number of times that step (d) is repeated, the encrypted value produced using a preceding byte of the pointer as the counter index being used in repeating step (d) additional times determined by a current byte of the pointer.

12. The method of claim 9, wherein three seed keys are provided for use in determining the portion of the session data encryption key, one of the three seed keys being used to encrypt a logical combination of the other two seed keys to produce the encrypted value in step (c) also being used to encrypt the pointer in step (e).

13. The method of claim 9, further comprising the steps of encrypting at least one cyclic redundancy check value for transmission to the other site, said cyclic redundancy check value being used to detect errors.

14. The method of claim 9, further comprising the step of encrypting a unique station identifier for transmission to the other site using one of the seed keys.

15. The method of claim 9, further comprising the step of selecting one of a plurality of sets of seed keys for use in determining the portion of the session data encryption key and for use in encrypting the pointer.

16. The method of claim 15, wherein a unique set of the seed keys is provided in common to all sites comprising a private network.

17. Apparatus for encrypting and decrypting data, comprising:

(a) encryption processor means for encrypting and decrypting data using an encryption key that is input thereto;

(b) control means, coupled to the encryption processor means, for controlling the operation of the encryption processor means, said control means controlling input to the encryption processor means of data from an external source for encryption and decryption and supplying the encryption processor means with the encryption key for use in encrypting and decrypting the data to produce an output signal in response to programmed instructions that cause the control means to automatically randomly select a pointer and to process a plurality of seed keys in repetitive cycles for a number of times determined as a function of the pointer, said seed keys initially being predefined, at least one of the seed keys being used as an encryption key that is input to the encryption processor by the control means to encrypt a temporary value derived as a function of at least one other seed key to produce a new temporary value for use in a next cycle, a last encrypted value thus produced comprising a part of a session data encryption key; and (c) non-volatile memory means, coupled to the control means, for storing the plurality of seed keys, which are initially predefined, and for storing the programmed instructions, said programmed instructions also causing the control means to:

(i) encrypt the pointer that was randomly selected to form an encrypted pointer;

(ii) transmit the encrypted pointer to a remote site;

(iii) input a different encrypted pointer received from the remote site to the encryption processor means for decryption using one of the plurality of seed keys, producing a different pointer;

(iv) determine a different part of the session data encryption key as a function of the different pointer that was decrypted and the plurality of the seed keys that are predefined, using the encryption processor means; and (v) logically combine the part of the session data encryption key determined locally with the different part of the session data encryption key determined as a function of the different pointer, to form a complete session data encryption key, said complete session data encryption key being input to the encryption processor means for encrypting and decrypting data during a communication session with the remote site.

18. The apparatus of claim 17, wherein the non-volatile memory means include an internal power source that supplies electrical power to maintain storage of the plurality of seed keys that are initially predefined, absent an external source providing electrical power.

19. The apparatus of claim 18, further comprising a potting material for encapsulating the encryption processor means, the control means, and the non-volatile memory means within a radio and light wave opaque material, said potting material being sufficiently hard and resistant to dissolution by solvents to prevent its removal without causing damage to interconnections coupling the non-volatile memory means to the control means and damage to interconnections supplying electrical power to the non-volatile memory means from the internal power source, such damage causing erasure of the plurality of seed keys and programmed instructions stored in the non-volatile memory means, said control means also responding to any attempt to externally interrogate the non-volatile memory means by causing erasure of the key encryption keys stored therein.

20. The apparatus of claim 17, further comprising means for selecting one of a plurality of sets of the seed keys that are stored in the non-volatile memory means, for use in a current communication session with the remote site, each set of seed keys being used on one of a corresponding plurality of different networks, so that encrypted data can be exchanged and decrypted only by using the same set of seed keys locally and at the remote site for encrypting and decrypting the pointers, thereby enabling encrypted communication only between sites in a common network.

21. The apparatus of claim 17, wherein the programmed instructions further cause the control means to determine at least one cyclic redundancy check value that is encrypted by the encryption processor means using one of the seed keys that is predefined to produce an encrypted cyclic redundancy check value that is transmitted to the remote, said at least one cyclic redundancy check value being used to determine whether an error has occurred.

22. The apparatus of claim 21, wherein the control means cause the encryption processor means to encrypt a cyclic redundancy check value for detecting an error in determining the part session data encryption key at the remote site as a function of the encrypted pointer that is transmitted thereto.

23. The apparatus of claim 21, wherein the control means causes the encryption processor means to encrypt a network cyclic redundancy check value for use in detecting an error at the remote site, if the remote site is not in an intended network.

24. The apparatus of claim 17, wherein the non-volatile memory means also store unique identification data for the apparatus that the programmed instructions preclude the control means from altering, and wherein the programmed instructions cause the control means to input the unique identification data to the encryption processor means for encryption using one of the plurality of seed keys that are predefined, for transmission to the remote site.

25. The apparatus of claim 24, wherein the programmed instructions cause the control means to terminate communications with the remote site if unique identification data that are received in an encrypted form from the remote site and then decrypted by the encryption processor means do not match the unique identification data stored in the non-volatile memory.

\* \* \* \* \*

UNITED STATES PATENT AND TRADEMARK OFFICE
CERTIFICATE OF CORRECTION

PATENT NO. : 5,455,862
DATED : October 3, 1995
INVENTOR(S) : J.D. Hoskinson

It is certified that error appears in the above-indentified patent and that said Letters Patent is hereby corrected as shown below:

| COLUMN | LINE | |
|---|---|---|
| 3 | 24 | "that determined" should read --that is determined-- |
| 4 | 1 | "determines" should read --determine-- |
| 7 | 4 | "carded" should read --carried-- |
| 9 | 30 | "employees" should read --employs-- |
| 12 | 48 | "it" should read --if-- |
| 13 | 64 | "determines" should read --determine-- |

Signed and Sealed this

Thirtieth Day of April, 1996

Attest:

BRUCE LEHMAN

*Attesting Officer*  Commissioner of Patents and Trademarks